US007280118B2

(12) United States Patent
Senn et al.

(10) Patent No.: US 7,280,118 B2
(45) Date of Patent: Oct. 9, 2007

(54) PROCESS FOR THE PRODUCTION OF A COLOR PALETTE

(75) Inventors: Thomas Senn, Dielsdorf (CH); Harold R. Van Aken, Wallkill, NY (US); Bruno Zimmermann, Zürich (CH); Peter Ehbets, Zürich (CH)

(73) Assignee: GretagMacbeth, LLC, New Windsor, NY (US)

( * ) Notice: Subject to any disclaimer, the term of this patent is extended or adjusted under 35 U.S.C. 154(b) by 28 days.

(21) Appl. No.: 10/116,394

(22) Filed: Apr. 4, 2002

(65) Prior Publication Data

US 2002/0167527 A1 Nov. 14, 2002

(30) Foreign Application Priority Data

Apr. 5, 2001 (EP) .................................. 01107802

(51) Int. Cl.
G09G 5/02 (2006.01)

(52) U.S. Cl. ..................................................... 345/594

(58) Field of Classification Search ................. 283/91, 283/114; 345/589–595, FOR. 122, FOR. 169, 345/FOR. 212; 358/1.9, 318; 427/2.17, 427/2, 68, 212, 268, 2.68
See application file for complete search history.

(56) References Cited

U.S. PATENT DOCUMENTS

| | | | |
|---|---|---|---|
| 5,590,251 A | 12/1996 | Takagi | |
| 5,650,942 A * | 7/1997 | Granger | ...................... 358/500 |
| 5,668,890 A | 9/1997 | Winkelman | |
| 5,798,943 A | 8/1998 | Cook et al. | |
| 5,857,176 A | 1/1999 | Ginsberg | |
| 5,933,578 A * | 8/1999 | Van de Capelle et al. | ... 358/1.9 |
| 5,991,511 A | 11/1999 | Granger | |
| 6,002,893 A * | 12/1999 | Caruthers et al. | ............. 399/54 |
| 6,052,195 A * | 4/2000 | Mestha et al. | .............. 356/425 |
| 6,081,253 A | 6/2000 | Luke et al. | |
| 6,278,533 B1 | 8/2001 | Takemoto | |
| 6,429,868 B1 * | 8/2002 | Dehner et al. | .............. 345/440 |
| 6,437,792 B1 * | 8/2002 | Ito et al. | ...................... 345/600 |
| 6,483,607 B1 * | 11/2002 | Van de Capelle et al. | ... 358/1.9 |
| 2002/0124757 A1 * | 9/2002 | Brydges et al. | ............. 101/484 |
| 2002/0149546 A1 * | 10/2002 | Ben-Chorin et al. | .......... 345/32 |

FOREIGN PATENT DOCUMENTS

| | | |
|---|---|---|
| EP | 0527108 | 9/1992 |
| EP | 0913674 | 10/1997 |

* cited by examiner

*Primary Examiner*—Matthew C. Bella
*Assistant Examiner*—Greg F. Cunningham
(74) *Attorney, Agent, or Firm*—McCarter & English, LLP

(57) ABSTRACT

A system and method are provided for producing a color palette including a multitude of color patterns for a predetermined coloring process with a multitude of defined base colors and for a predetermined substrate. The individual color patterns are systematically, especially equidistantly, defined in a mathematically defined color space by the way of color coordinates describing the color space. The spectrum of the color pattern is synthesized by calculation for each color pattern in the color space by way of a color mixing model representing the predetermined coloring process and the predetermined substrate, whereby that spectrum is selected having the highest color constancy. The spectra synthesized by calculation are stored in relation to the color coordinates of the underlying color patterns. Through use of a mathematical/physical basis (such as the CIE-system), it is possible to define a visually equidistant color space and assign a spectral curve to individual points having the best color constancy.

12 Claims, 1 Drawing Sheet

PROCESS FOR THE PRODUCTION OF A COLOR PALETTE

BACKGROUND OF THE INVENTION

1. Field of the Invention

The present disclosure relates to a system and method for producing a color palette. In particular, the present disclosure relates to a system and method for producing a color palette including a plurality of color patterns.

2. Background of the Related Art

Currently, the design process for reproducing colors (such as for example, during production of a company logo) begins by using physical color systems in the form of fans or arrays, tables and atlases. The designer selects a color to have reproduced by a specific color reproduction process, such as printing or copying, onto a particular substrate.

The primary goal is to produce a color that closely resembles the color that was originally selected. However, color perception depends on variables including the reproduction process and properties of the substrate. As such, it would be advantageous if a designer could select a color from a color book of samples that were created under substantially the same conditions as the subsequent reproduction. However, creation of such an extensive group of physical color books is not always possible. Furthermore, it would be expensive and cumbersome, and would, among other things, significantly increase the time spent and complicate the sample selection process.

Color perception also depends on illumination, so the reproduction should preferably have a high color constancy. Color constancy refers to the lack of change in the perceived color as the global illumination changes. It also refers to a computation of perceived surface color. Thus, the reproduction should, for as many light sources as possible, generate the same color impression as that of the selected sample in the color system. It is not necessary to replicate or search for the same spectral curve as that of the selected sample (as is customary in color recipe systems), but for a spectral curve which fulfills the desired color constancy.

Thus, it would be especially advantageous for a designer to be able to quickly ascertain whether a certain color can be reproduced with several processes (for example, viewing the color as reproduced by being offset on painted paper and offset on newsprint) with color constancy. A growing tendency exists to create colors for selection on a screen with the help of computer programs. However, such colors are only colorimetrically defined, and spectral curves are not present for the color samples. As previously noted, the presence of a spectral curve for a color is especially advantageous for obtaining color constancy, among other things. For example, metameric effects in the later production process can only be estimated with the help of a spectral curve.

The color systems in use today insufficiently support this design process and have notable disadvantages. They can be classified or characterized as follows:

1. Systems Based on Color Mixing (e.g., Pantone®, HKS, etc.)

These systems are based on a certain number of base colors (for example 14 for Pantone), which are mixed at predefined concentrations with each other in order to maintain the most even and complete coverage possible of the color space. The relationship between concentration and color perception is significantly non-linear in some areas, which makes it difficult to estimate the concentration levels that would comply with the visual equidistance. The conditions of the coloring (or printing) process must be precisely defined (by substrate, print colors, etc.) so that corresponding systems can be generated. Since the color space is defined by way of concentrations, a change of the coloring process is practically made impossible. The color constancy of the samples is not a criterion for the manufacture of such color systems.

2. Systems Based on Color Perception (e.g. Munsell)

The Munsell system is based on the three color perceptions: color tone, brightness and saturation. The main principle of the division of the color space is visual equidistance. Ten visually equidistant base color tones are defined, which in turn are divided into ten equidistant sub color tones. The brightness is also divided into ten individually equidistant levels. Different materials can be used to realize such a color space (e.g., paints or plastic). The criterion of the color constancy can be taken into consideration for the manufacture of such color systems.

A disadvantage common to the two proceeding system types relates to the fact that no mathematical basis exists for the definition of the color space. A further important disadvantage consists in the cost necessary for the manufacture of color atlases for these systems.

3. The CIE System

The Centre Internationale de l'Eclairage (CIE) is an international organization that establishes methods for measuring color. These color standards for colormetric measurements are internationally accepted specifications that define color values mathematically. The first color space model, the CIE "xyz" model, was developed in 1931. CIE defines color as a combination of three axes: x, y, and z. The three points are represented as a tri-dimensional space, known as the color space. The two color spaces released in 1978 are CIE-Lab and CIE-Luv. The CIE system describes how a spectral power distribution can be transformed into a set of three numbers that specifies a color. The three-color coordinates "L, a, b" can be calculated from a color stimulus, such as for example, light source and remission (reflection) of a material. The demand for the visual equidistance is fulfilled to some degree under consideration of special color spacing formulas ($D_D$Ecmc, $D_D$E94).

CIE color models are considered to be device independent because the colors should not differ, theoretically, from one output device to another if properly calibrated. CIE color models help move color values from one system to another (e.g., from the Red-Green-Blue color space typically used in monitors to the Cyan-Magenta-Yellow color space typically used in printers), but there is no way to produce colors using CIE values alone. Also, the colors produced by reflective systems, such as photography, printing or paint, are a function not only of the colorants but also of the spectral power distribution of the ambient illumination. If the application has a strong dependence upon the spectrum of the illuminant, spectral matching is required. Thus, a major disadvantage of the CIE system is that the CIE system does not assign color values to a spectral curve.

In view of the aforementioned problems, deficiencies and disadvantages associated with the known color reproduction systems, it would be beneficial to provide a device and/or methodology for providing a color system having an exact mathematical basis for providing the color values and a spectral curve which is assigned to such color values to enhance color constancy.

SUMMARY OF THE INVENTION

It is now an object of the invention to provide a system and method for the production of a color palette, the system and method overcoming the disadvantages of the known color systems.

Accordingly, the present invention now provides a system and method for the production of a color palette including a multitude of color patterns for a predetermined coloring process operating with a multitude of defined base colors and for a predetermined substrate, including the steps of:

- systematically, especially equidistantly, defining the individual color patterns in a mathematically defined color space by way of color coordinates describing the color space;
- synthesizing by calculation the spectrum of the color pattern for each color pattern in the color space by way of a color mixing model representing the predetermined coloring process and the predetermined substrate; and
- storing the spectra synthesized by calculation in relation to the color coordinates of the underlying color patterns.

The color palette produced according to the method and system of the invention represents an assignment of color locations of a color space with mathematical basis to remission curves which are realized by a given coloring process (such as color mixing or laser printing), with a given number of base colors and a given substrate. Typically, color assortments with about 10-15 base colors are used as base colors for the color mixing for a respective coloring process, such as offset, flexo, intaglio or screen printing, and also paints and plastic. The conventional four spectrum colors of cyan, magenta, yellow and black form the basis for the raster printing. The substrates may either be absorbent or nonabsorbent, and preferably have a high (as neutral as possible) remission (i.e., no inherent color). The color space is typically based upon the CIE-Lab system because it can fulfill the demand for a mathematical basis as well as for the visual equidistance, among other things.

The CIE-Lab-color space is initially divided into a grid of color points (Lab coordinates). In the simplest case, this can be an equidistant grid (Cartesian coordinates L, a, b). In order to represent all colors, three imaginary or ideal primaries are used in the CIE system. The lightness component L, otherwise known as luminance, can range from 0 to 100. A lightness value of 0 equals black and a value of 100 equals white (i.e., the higher the value, the more vivid the color). The other two channels, a and b, represent color ranges. The "a" channel contains colors ranging from green to red and the "b" channel contains colors ranging from blue to yellow.

To improve the visual equidistance, regular grids (polar coordinates L, C, h) can also be applied (L=brightness, lightness; C=saturation, chroma; and h=color tone, hue). The grid points are thereafter processed with the help of a generally known color recipe system, such as for example, the software program "GretagMacbeth Ink Formulation." The resulting recipes for the base colors can be sorted according to the color constancy (or minimal color inconstancy index) and/or another suitable criterion, such as for example, by price, and the remission curve best suited in view of the criterion is assigned to a grid point. If more than three base colors are permitted in a recipe for the mixing, additional degrees of freedom are generated which can be used for optimization of the remission curve with respect to the color constancy.

There are many different variants of color recipe systems. Mixtures/overprints of base colors can be found by way of a three-dimensional input value (e.g., the Lab-color coordinates), the remission curves thereof providing the preset point of the CIE-Lab-color space. Thus, the calculation of the color coordinates of the CIE system by way of the remission curves is generally known and described in many standards and textbooks.

The following exemplary recipe systems and the associated mathematical models are described in the literature and can be used for the calculation of the remission curves according to the present disclosure. It is possible to distinguish these systems between systems that are based on color mixing and systems based on raster printing:

- Kubelka-Munk-Modell (P. Kubelka and F. Munk: "Beitrag zur Optik der Frabanstriche" [contribution to the optic of paints] in Zeitschrift for technische Physik [Journal of technical physics], $12^{th}$ year, Nr. 11a, pp. 593-601, 1931)
- Hoffmann-Schmelzer-Modell (K. Hoffmann: "Zusammenhang zwischen Extinktion und Remission nicht streuender Farbschichten auf weissem Untergrund" [Connection between extinction and remission of non-scattering color layers on white background] in Farbe and Lack' [Paint and Lacquer] 7, pp. 665-673, 1970 as well as H. Schmeizer: "Farbrezeptberechnung for Offset- and Buchdruckfarben" [Color recipe calculation for offset and book printing colors] in Farbe and Lack' [Color and Lacquer 4, p. 208, 1978
- Mudgett-Richards-Modell (P. S. Mudgett and L. W. Richards: "Multiple Scattering Calculation for Technology" in 'Applied Optics'—Vol. 10, No. 7, Seite 1485, July 1971).
- Emmel-Hersch-Modell (P. Emmel and R. D. Hersch: "A Unified Model for Color Prediction of Halftoned Prints" in the 'Journal of Imaging Science and Technology', Vol. 44, Nr. 4, July/August 2000).
- Different classical models such as Clapper-Yule, Murray-Davis and Williams-Clapper can be derived as special cases from the general theory of the Emmel-Hersch-Model.

Preferably, and as previously mentioned, the GretagMacbeth Ink Formulation Software based on the Mudgett-Richards-Model is used with a system and method in accordance with the present disclosure. However, other software using different models may advantageously be used with a system and method in accordance with the present disclosure. These and other unique features of the system and method disclosed herein will become more readily apparent from the following detailed description and with reference to the accompanying drawing.

BRIEF DESCRIPTION OF THE FIGURE

So that those having ordinary skill in the art to which the subject invention pertains will more readily understand how to make and use the method and system of the present disclosure, embodiments thereof will be described in detail herein below with reference to the accompanying FIGURE, wherein.

DETAILED DESCRIPTION OF THE INVENTION

Figure 1:
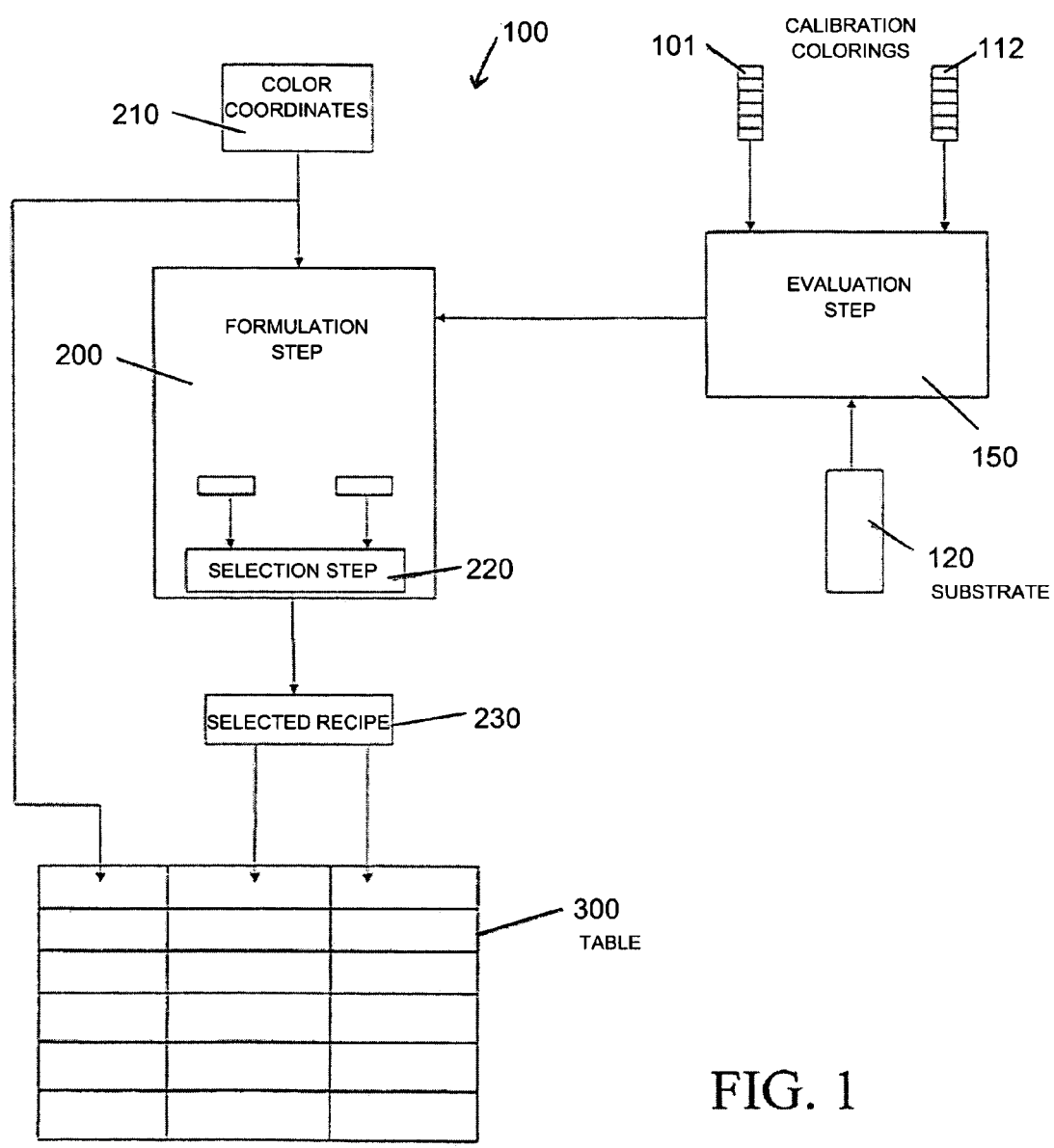
FIG. 1 illustrates an exemplary schematic of a system and method in accordance with the present disclosure.

Principally, any mathematically defined color space is suitable for use with the method and system in accordance with the present disclosure. However, for reasons of simplicity, the generally used CIE-Lab-color space is used herein as an example to illustrate the features and novelty of the method and system in accordance with the present disclosure.

It is known that only a partial space of the CIE-Lab-color space is realizable depending on the coloring process (printing process, etc.) for a given substrate. The theoretically possible points in the Lab-color space are difficult to determine and the surface of the Lab-body has a relatively complex shape. Thus, the following procedure is used to obtain the realizable color space.

The value range for the L-coordinate in the CIE-Lab-color space extends from 0-100. Typically, 10-20 values (which may be equidistant values) are selected for the L-coordinate within this value range and one continues with the smallest of these values (for example L=0) with the following algorithm:

Initially, recipes (spectral curves) for the coordinates a=0 and b=0 are calculated with the help of the recipe system. Thereafter, color mixes are conducted for points (a, b) which lie at a distance d (typically d=5 or 10) in a square with the corner points (d, d), (−d, d), (−d, −d), (d, −d), which includes (d, 0), (d, d), (0, d), (−d, d), (−d, 0), (−d, −d), (0, −d), and (d, −d). The square (i.e., quadrilateral) with the corner points (2d, 3d), (−2d, 3d), (−2d, −3d), (2d, −3d) is determined, as well as other quadrilaterals or squares having all points defined by distance d, until no spectral curve can be found for a particular form which realizes at least one of the four corner points. The formulation for this L-level is terminated and the same procedure is reiterated for the next L-level. In this manner, all points of the realizable Lab-color space (i.e., the color space that can actually be obtained by a certain printing process) is determined, and a table of color coordinates with their corresponding spectral curves is generated, thus becoming a color palette produced in accordance with the present disclosure.

The aforementioned process is based on Cartesian coordinates. The division of the a, b-plane may also be performed via polar coordinates. The formulation, instead of being based on squares or quadrilaterals, is conducted on the basis of circles of constant color saturation (i.e., chroma). In the simplest scenario, the radii are selected as a multiple of a base radius (r, 2r, 3r, . . . ) but, to improve the equidistance of the grid points, it can also be selected at distances conforming to $D_DE94$. The a, b-plane for the angles (color tone, hue) is preferably divided in half, according to the following formula: $w(I)-w(I-1)=D_Dw$.

The aforementioned color mixing program "GretagMacbeth Ink Formulation" is typically used for the computer synthesizing of the spectral recipe calculation. The primary object of the color mixing program consists in the reproduction of an original color with a certain number of base colors (generally, 3-4) being as free of metamerics as possible. This is achieved by synchronizing the spectral curves or the calorimetric values (color coordinates) of original and recipe.

Typically, color assortments with 10-15 base colors are used as base colors for the color mixing for the respective coloring process (for example, offset, flexo, intaglio or screen printing, but also paints and plastic). The substrates used may be either absorbent or non-absorbent and preferably have as neutral as possible remission (i.e., no inherent color).

The actual formulation is preceded by a calculation of the optical data (absorption and scattering spectra) for the base colors. Calibration colorings, such as for example, mixtures with a clear medium, are produced on a predetermined substrate from the base colors. The calibration colorings are measured spectrometrically, and the measured data is analyzed according to generally known methods. A computer program such as the aforementioned program "GretagMacbeth Ink Formulation" can be used for this process. The "GretagMacbeth Ink Formulation" program also advantageously calculates the optical data of the base colors independently from the substrate. Thus, the optical data may be used with other substrates, so long as remission spectrum and the absorption factor of the respective substrate is also provided.

For generating a color palette system in accordance with the present disclosure, the "GretagMacbeth Ink Formulation" program is switched to color coordinate formulation. The light source and observer values must be predetermined. Typically, it is D65 for the light source and 2° for the observer, but other values may be used. After selection of the color assortment (coloring or printing process) and the substrate, the formulation can be commenced.

Two scenarios in the formulation of color coordinates may be distinguished. The first involves a combination of exactly three base colors. The mixing portions, and therefore the spectral curve, resulting in the target color coordinates are about exactly determined. Generally, there are many combinations of the base colors which are able to realize the target color coordinates. Thus, a criterion for determining the best combination is necessary. In accordance with the present disclosure, the best combination is determined by selecting the spectral curve which exhibits the best color constancy.

The second scenario involves a formulation with a combination of more than three base colors. In this scenario, the mixing portions (and therefore, also the spectral curve) that result in the target color coordinates are not clearly determined. Apart from the color coordinates, a further parameter may be specified. For example, in accordance with the present disclosure, the requirement for maximum color constancy can be included to optimize the selection. Thus, the spectral curve associated with a combination is ultimately obtained which exhibits the best color constancy.

As discussed above, color constancy is the tendency of a color sample to maintain the appearance of its color upon a change of the color and/or level of the light source. Some texts (see, for example, Billmeyer and Saltzman: "Principles of Color Technology", third edition, John Wiley & Sons, New York, pages 128 ff) describe practical use of the opposite effect. This is referred to as the color inconstancy, which is quantitatively described by a color inconstancy index "CII". The degree of color inconstancy for a sample is represented by the Euclidean difference (color distance) between the corresponding color of a sample, or color coordinates calculated from the spectral curve (such as for example, remission), and the actual color of that sample measured, or computed via its color coordinates in the reference illuminant. The larger the Euclidean color distance, the greater the color inconstancy and vice-versa.

A better estimate of the visual color perception can be determined by the use of the known $D_DE94$ formulas, wherein "ref" means a reference light type, "test" means a test light type and "L" stands for brightness (lightness), "C" stands for color saturation (chroma) and "H" for color tone (hue):

$$CH = \sqrt{\left(\frac{\Delta L^*}{2S_L}\right)^2 + \left(\frac{\Delta C * ab}{2S_c}\right)^2 + \left(\frac{\Delta H * ab}{S_H}\right)^2}$$

$$\Delta L^* = L^*(\text{test}) - L^*(\text{ref})$$

$$\Delta C^*_{ab} = C^*_{ab}(\text{test}) - C^*ab(\text{ref})$$

$$\Delta H^*_{ab} = H^*_{ab}(\text{test}) - H^*_{ab}(\text{ref})$$

$$S_L = 1$$

$$S_C = 1 + 0.045 * C^*_{ab}(\text{ref})$$

$$S_H = 1 + 0.015 * C^*_{ab}(\text{ref})$$

For a more accurate calculation of the color inconstancy index, the test light type must initially be subjected to a transformation (i.e., chromatic adaptation transform). The new color coordinates (and corresponding color) calculated therefrom can then again be inserted into the above formula. Further details are described, for example, in the appendix F to the mentioned book Billmeyer and Saltzman: "Principles of Color Technology", $3^{rd}$ edition, John Wiley & Sons Inc.

The accompanying FIG. 1 illustrates a schematic overview of the individual steps of a system and method in accordance with the present disclosure, generally designated by the numeral 100.

Calibration colorings (collectively referred to as 101 . . . 112 in FIG. 1) of the base colors involved in the underlying printing process and the underlying substrate 120 are measured by any conventional means, such as by a spectrophotometer. There may be one or more calibration colorings for the base colors and/or substrates. Optical data for the base colors are determined from the measured data in evaluation step 150. The optical data can include information such as scattering spectra and absorption spectra. Evaluation step 150 may be performed by a computer program stored and operated on a computer having the various necessary hardware, such as a data processor and memory device, among other things. The optical data are used in a formulation step 200 as parameters for the underlying printing process.

Color coordinates (L, a, b-values) 210 of the grid points for the color space are also provided as input parameters to system 100 in formulation step 200. Formulation step 200 calculates all possible color recipes for the respective grid points. A selection step 220 selects the color recipe with the highest color constancy from the color recipes calculated in formulation step 200. Formulation step 200 and selection step 220 may be performed by a computer program stored and operated on a computer having the necessary hardware, such as a data processor and a memory device. The spectrum belonging to the selected recipe 230 as well as the concentrations for surface coverings of the associated base colors are respectively entered in a table 300. The color coordinates 210 relating to the associated base colors are also entered in table 300. Thus, table 300 represents a color palette produced in accordance with the present disclosure. Preferably, table 300 is stored electronically, such as in a database.

The present disclosure provides a system and method for enabling the production of a color palette having a mathematical/physical basis. This permits defining a visually equidistant color space and/or assigning individual points in the space a spectral curve having the best color constancy.

The complete color palette can be produced with relatively few test prints (i.e., calibration colorings) for the base colors and the determination of the substrate on which printing is to occur. Furthermore, additional optimization criteria (such as, for example, color constancy, etc.) can be easily integrated with the color palette system and method in accordance with the invention. A precise color communication is possible since each color location is assigned a spectrum.

Although exemplary and preferred embodiments of the present disclosure have been described herein with a full set of features, it is to be understood that the disclosed system and method may be practiced successfully without the incorporation of each of those features. It is to be further understood that modifications and variations may be utilized without departure from the spirit and scope of this inventive system and method, as those skilled in the art will readily understand. Such modifications and variations are considered to be within the purview and scope of the appended claims and their equivalents.

The invention claimed is:

1. A method of producing colors based on base colors, comprising the steps of:
   a) defining a plurality of color patterns in a color space by color coordinates, wherein each color pattern represents a mixture of a plurality of base colors, wherein the color patterns are independent from a particular print process and a particular substrate;
   b) providing color mixing modeling data relating to the particular color print process and a particular substrate;
   c) calculating spectral data associated with the particular color print process and the particular substrate for each color pattern of the plurality of color patterns using the color mixing modeling data; and
   d) generating a color palette including a plurality of color patterns resulting from the calculated spectral data.

2. The method of claim 1, further comprising the step of storing the spectral data for each color pattern and the associated color coordinates in a database.

3. The method of claim 1, further comprising the step of selecting the spectral data for each color pattern associated with the highest color constancy.

4. The method of claim 1, wherein the step of providing color mixing modeling data relating to the particular color print process and the particular substrate further comprises entering calibration information for each base color.

5. The method of claim 1, wherein the step of defining a plurality of color patterns in a color space by color coordinates, wherein each color pattern represents a mixture of a plurality of base colors further comprises defining the color patterns equidistantly.

6. The method of claim 1, wherein the step of defining a plurality of color patterns in a color space by color coordinates, wherein each color pattern represents a mixture of a plurality of base colors further comprises defining the color patterns in a CIE-L,a,b color space with cartesian color coordinates.

7. The method of claim 1, wherein the step of defining a plurality of color patterns in a color space by color coordinates, wherein each color pattern represents a mixture of a plurality of base colors further comprises defining the color patterns in a CIE-L,c,h color space with polar color coordinates.

8. The method of claim 1, wherein the step of calculating spectral data for each color pattern of the plurality of color patterns using the color mixing modeling data further comprises using color mixing modeling data based on a color formulation algorithm.

9. The method of claim 1, wherein the step of calculating spectral data for each color pattern of the plurality of color patterns using the color mixing modeling data further comprises using color mixing modeling data based on a color formulation algorithm selected from the group consisting of an algorithm according to Kubelka-Munk, Hoffman-Schmelzer, and Mudgett-Richards.

10. The method of claim 1, wherein the step of calculating spectral data for each color pattern of the plurality of color patterns using the color mixing modeling data further comprises using color mixing modeling data based on a raster formulation algorithm.

11. The method of claim 1, wherein the step of calculating spectral data for each color pattern of the plurality of color patterns using the color mixing modeling data further comprises using color mixing modeling data based on a raster formulation algorithm according to Emmel-Hersch.

12. The method of claim 1, wherein said calculation is based on spectral data of reflectance for each color pattern.

* * * * *